(12) United States Patent
Batchko et al.

(10) Patent No.: US 7,697,214 B2
(45) Date of Patent: Apr. 13, 2010

(54) FLUIDIC LENS WITH MANUALLY-ADJUSTABLE FOCUS

(75) Inventors: Robert G. Batchko, Albuquerque, NM (US); Andrei Szilagyi, Danville, CA (US)

(73) Assignee: Holochip Corporation, Albuquequer, NM (US)

( * ) Notice: Subject to any disclaimer, the term of this patent is extended or adjusted under 35 U.S.C. 154(b) by 0 days.

(21) Appl. No.: 12/117,625

(22) Filed: May 8, 2008

(65) Prior Publication Data
US 2008/0285143 A1 Nov. 20, 2008

Related U.S. Application Data

(63) Continuation-in-part of application No. 11/383,216, filed on May 14, 2006, and a continuation-in-part of application No. 11/747,845, filed on May 11, 2007.

(60) Provisional application No. 60/916,739, filed on May 8, 2007, provisional application No. 60/680,632, filed on May 14, 2005, provisional application No. 60/683,072, filed on May 21, 2005, provisional application No. 60/703,827, filed on Jul. 29, 2005, provisional application No. 60/723,381, filed on Oct. 3, 2005, provisional application No. 60/747,181, filed on May 12, 2006.

(51) Int. Cl.
*G02B 3/12* (2006.01)
(52) U.S. Cl. ..................................... 359/665
(58) Field of Classification Search .......... 359/665–667
See application file for complete search history.

(56) References Cited

U.S. PATENT DOCUMENTS

| 696,788 A | | 4/1902 | Clile |
| 2,300,251 A | * | 10/1942 | Flint ......................... 359/665 |
| 2,504,039 A | * | 4/1950 | O'Leary ..................... 359/478 |
| 4,261,655 A | | 4/1981 | Honigsbaum |
| 4,444,471 A | | 4/1984 | Ford, Jr. et al. |
| 4,466,706 A | | 8/1984 | Lamothe, II |
| 4,514,048 A | | 4/1985 | Rogers |

(Continued)

FOREIGN PATENT DOCUMENTS

WO        WO 99/18456        4/1999

OTHER PUBLICATIONS

Notice of Allowance dated Mar. 10, 2009 for U.S. Appl. No. 11/747,845.

(Continued)

*Primary Examiner*—Darryl J Collins
(74) *Attorney, Agent, or Firm*—Joshua D. Isenberg; JDI Patent

(57) ABSTRACT

A fluidic lens may have a transparent window member, a transparent distensible membrane, an inner ring between the window member and membrane, and a top ring disposed such that the membrane is between the piston ring and the inner ring. A layer of liquid may be stored between the window member, the inner ring and the membrane. The top ring may be adapted to apply a liquid displacement force to the membrane in a direction perpendicular to a plane of an aperture of the inner ring to cause a change in a radius of curvature of the membrane. The membrane may be pre-tensioned prior to assembly with the other components.

23 Claims, 5 Drawing Sheets

U.S. PATENT DOCUMENTS

| | | | |
|---|---|---|---|
| 4,783,155 A * | 11/1988 | Imataki et al. | 359/666 |
| 4,784,479 A | 11/1988 | Ikemori | |
| 4,890,903 A | 1/1990 | Treisman et al. | 359/666 |
| 5,672,001 A | 9/1997 | Bertling et al. | |
| 5,774,273 A | 6/1998 | Bornhorst | |
| 5,973,852 A | 10/1999 | Task | |
| 6,288,767 B1 | 9/2001 | Murata et al. | |
| 6,369,954 B1 | 4/2002 | Berge et al. | |
| 6,542,309 B2 * | 4/2003 | Guy | 359/666 |
| 6,618,208 B1 | 9/2003 | Silver | |
| 6,860,601 B2 * | 3/2005 | Shadduck | 351/176 |
| 7,068,439 B2 | 6/2006 | Esch et al. | |
| 7,072,086 B2 | 7/2006 | Batchko | |
| 7,142,369 B2 | 11/2006 | Wu et al. | |
| 7,218,429 B2 | 5/2007 | Batchko | |
| 7,218,430 B2 | 5/2007 | Batchko | |
| 7,359,124 B1 | 4/2008 | Fang et al. | 359/666 |
| 7,369,321 B1 | 5/2008 | Ren et al. | 359/666 |
| 7,369,723 B1 | 5/2008 | Mescher | |
| 7,374,301 B1 | 5/2008 | Simmers | |
| 7,440,193 B2 | 10/2008 | Gunasekaran et al. | 359/666 |
| 7,453,646 B2 | 11/2008 | Lo | 359/665 |
| 2004/0240076 A1 * | 12/2004 | Silver | 359/666 |
| 2004/0262645 A1 | 12/2004 | Huff et al. | |
| 2006/0077562 A1 * | 4/2006 | Silver | 359/676 |
| 2006/0126190 A1 | 6/2006 | Berge et al. | |
| 2006/0164731 A1 | 7/2006 | Wu et al. | |
| 2007/0030573 A1 | 2/2007 | Bathcko et al. | |
| 2007/0211207 A1 | 9/2007 | Lo et al. | |
| 2007/0263293 A1 | 11/2007 | Batchko et al. | |
| 2009/0021823 A1 | 1/2009 | Heim et al. | 359/290 |
| 2009/0040361 A1 | 2/2009 | Heim et al. | 348/340 |
| 2009/0052049 A1 * | 2/2009 | Batchko et al. | 359/666 |

OTHER PUBLICATIONS

Office Action dated Mar. 5, 2009 for U.S. Appl. No. 11/928,216.
Final Office Action dated Jan. 22, 2009 for U.S. Appl. No. 11/383,216, 17 pages.
Notice of Allowance and Fee(s) Due dated Apr. 9, 2009 for U.S. Appl. No. 11/383,216, 6 pages.
Notice of Allowance and Fee(s) Due dated Apr. 23, 2009 for U.S. Appl. No. 11/928,076, 7 pages.
Ex parte Quayle Action dated Aug. 20, 2009 for U.S. Appl. No. 11/928,076 entitled "Fluidic Optical Devices".
Notice of Allowance dated Aug. 13, 2009 for U.S. Appl. No. 11/928,216 entitled "Fluidic Optical Devices".
Notice of Allowance dated Aug. 28, 2009 for U.S. Appl. No. 11/383,216 entitled "Fluidic Optical Devices".
Notice of Allowance dated Jul. 9, 2009 for U.S. Appl. No. 11/747,845 entitled "Fluidic Lens With Electrostatic Actuation".
Non-final Office Action dated Sep. 21, 2009 for U.S. Appl. No. 11/928,376 entitled "Fluidic Optical Devices".
U.S. Appl. No. 60/916,739, filed May 8, 2007.
U.S. Appl. No. 60/680,632, filed May 14, 2005.
U.S. Appl. No. 60/683,072, filed May 21, 2005.
U.S. Appl. No. 60/703,827, filed Jul. 29, 2005.
U.S. Appl. No. 60/723,381, filed Oct. 3, 2005.
U.S. Appl. No. 60/747,181, filed May 12, 2006.
International Search Report and Written Opinion of the International Searching Authority for the International application No. PCT/US08/63107 dated Aug. 4, 2008, 7 pages.
U.S. Appl. No. 60/395,849, to Batchko, entitled "Digital Focus Lens System" filed Jul. 11, 2002.
U.S. Appl. No. 60/242,395, to Batchko, entitled "Combinatorial Optics" filed Oct. 20, 2000.
J. Chen et al., "Variable-Focusing Microlens with Microfluidic Chip", J. Micromech.Microeng. 14, p. 675-680, 2004.
S. Perichon et al. "Stretchable Gold Conductors on Elastomeric Substrate", Applied. Physics. Letter, vol. 82, No. 15, p. 2404-2406, Apr. 14, 2003.
Hongwen Ren et al. "Variable-Focus Liquid Lens By Changing Aperature", Applied Physics Letters, vol. 86, No. 21107, May 17, 2005, p. 211107-1-211107-3.
International Search Report and Written Opinion of the International Searching Authority dated Aug. 8, 2008—International Patent Application No. PCT/US08/63122, 9 pages.
Office Action dated Jul. 23, 2008 for U.S. Appl. No. 11/747,845, 9 pages.
Office Action dated Oct. 22, 2008 for U.S. Appl. No. 11/928,076, 8 pages.
Office Action dated Jun. 12, 2008 for U.S. Appl. No. 11/383,216, 22 pages.

* cited by examiner

FLUIDIC LENS WITH MANUALLY-ADJUSTABLE FOCUS

CLAIM OF PRIORITY

This application claims the benefit of priority of U.S. Provisional Patent Application No. 60/916,739, filed May 8, 2007, the entire contents of which are incorporated herein by reference. This application is a continuation-in-part of and claims the benefit of priority of U.S. patent application Ser. No. 11/383,216 filed May 14, 2006, published as US Patent Application Publication 20070030573 A1, and U.S. patent application Ser. No. 11/747,845 filed May 11, 2007, published as US Patent Application Publication 20070263293, both of which are incorporated herein by reference. The benefit of priority is also claimed to U.S. Provisional Patent Applications 60/680,632 filed May 14, 2005, 60/683,072 filed May 21, 2005, 60/703,827 filed Jul. 29, 2005, 60/723,381 filed Oct. 3, 2005, and 60/747,181 filed May 12, 2006, the entire disclosures of which are incorporated herein by reference.

FIELD OF THE INVENTION

This invention relates generally to optics. More particularly, it relates to fluidic optical devices.

BACKGROUND

Actuated fluidic lens structures are described in commonly owned patent applications. These include U.S. patent application Ser. No. 11/383,216, published as US Patent Application Publication 20070030573 A1, and U.S. patent application Ser. No. 11/747,845, published as U.S. Patent Application Publication 20070263293, both of which are incorporated herein by reference, and U.S. Provisional Patent Applications 60/680,632, 60/683,072, 60/703,827, 60/723,381, and 60/747,181, the entire disclosures of which are incorporated herein by reference. The predecessor of the present family of devices is a fluid-filled chamber capable of squeezing transparent fluid into a centrally-disposed elastic-membrane-delimited lens. Pressurization of the fluid causes the membranes to bulge, thereby controllably altering the optical power of the lens. The elastic energy of the membranes provides the restoring force which prevails, once the actuating force is diminished.

It is within this context that embodiments of the present invention arise.

SUMMARY OF THE INVENTION

According to embodiments of the present invention a fluidic lens may have a transparent window member; a transparent distensible membrane; an inner ring between the transparent window member and the membrane; a layer of liquid stored between the window member, the inner ring and the membrane; and a piston ring disposed such that the membrane is between the piston ring and the inner ring. The piston ring may be adapted to apply a liquid displacement force to the membrane in a direction perpendicular to a plane of an aperture of the inner ring to cause a change in a radius of curvature of the membrane.

The piston ring may be characterized by an aperture radius and an annular thickness, wherein the annular thickness is greater than about 20%, 40%, 60%, 80%, or 100% of the annular radius. The inner ring may have a conic frustum shaped inner surface characterized by a half angle. The outer ring may also have a conic frustum shaped outer surface characterized by a half angle that is substantially the same as the half angle for the inner surface of the inner ring.

An outer edge of the piston ring may be threaded. A surrounding structure may be adapted to receive the inner ring, membrane and piston ring, the surrounding structure having inner threads that mate with the threads at the outer edge of the piston ring.

DETAILED DESCRIPTION

As discussed above, actuated fluidic lens structures described in commonly owned patent applications may be based on a fluid-filled chamber capable of squeezing transparent fluid into a centrally-disposed elastic-membrane-delimited lens. Pressurization of the fluid causes the membranes to bulge, thereby controllably altering the optical power of the lens. The elastic energy of the membranes provides the restoring force which prevails, once the actuating force is diminished. Embodiments of the present invention are related to a family of fluidic optical devices with expanded applicability.

Figure 1:
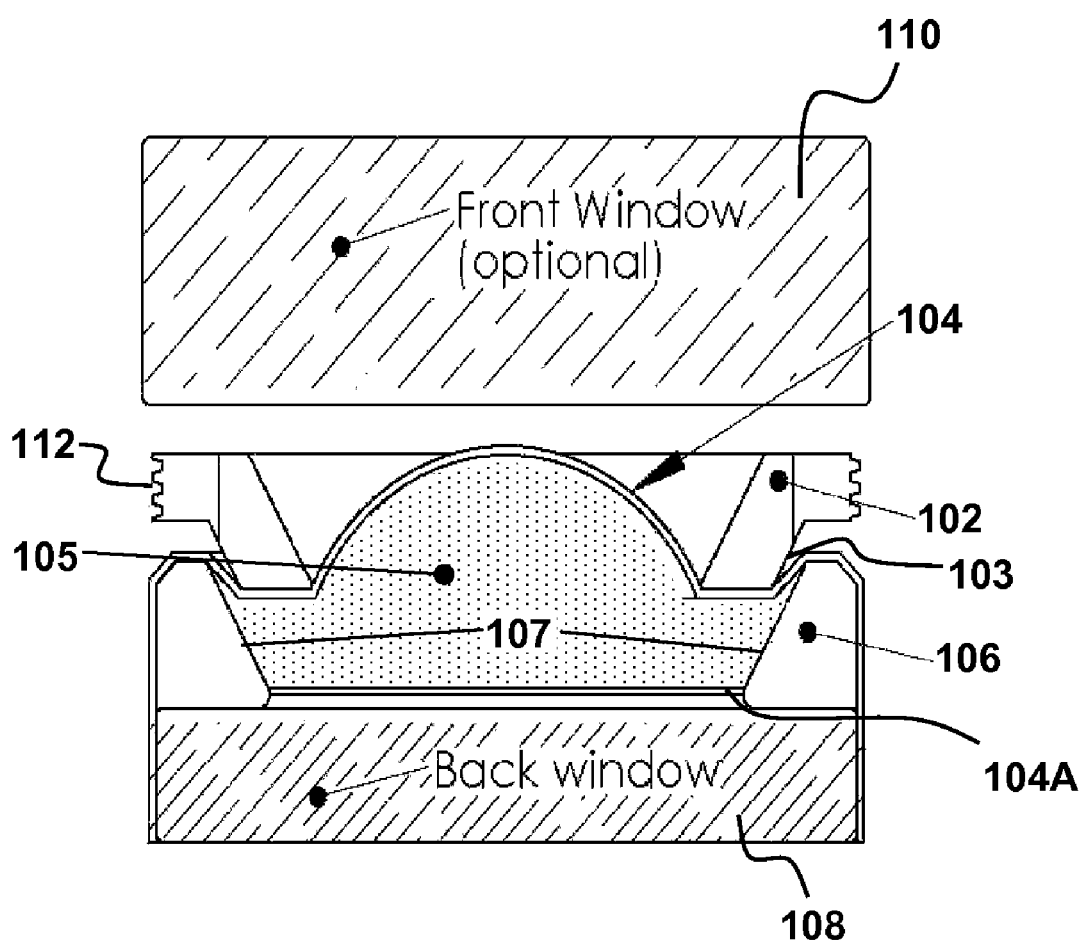
FIG. 1 is a cross-sectional diagram of a fluidic lens according to an embodiment of the present invention.

A cross section of an embodiment of the present device structure is illustrated in FIG. 1. A fluidic lens 100 may comprise a ring shaped piston (piston ring or top ring) 102 that indents the surface of a transparent membrane 104 which separates an inner space filled with a liquid 105 from ambient air. Displacement of the liquid 105—the liquid being essentially incompressible—causes a central portion of the membrane 104 to bulge outwardly into an energy-minimizing shape. In the case of a thin membrane, the stretching of the membrane is associated with an increase in hydrostatic pressure, for which the energy minimizing shape is a simple spherical cap as seen in FIG. 1.

An immovable portion of the membrane 104 may be anchored between an Outer Ring (not shown) and an Inner Ring 106. The inner ring 106 has an inner surface that provides a lateral boundary for the refractive fluid. In some embodiments, the Inner Ring 106 may include one or more reservoirs in fluid communication with an aperture region of fluidic lens 100. Examples of such configurations are described, e.g., in US Patent Application Publication 20070030573 and US Patent Application Publication 20070263292, both of which are incorporated herein by reference. As shown in FIG. 1, the inner ring 106 may have a conic-frustum inner surface 107, which forms a lateral boundary of the refractive fluid 105. The top ring 102 may have an outer edge with a conic-frustum surface 103. The remaining fluid boundary may be provided by a Back Window 108. In co-pending patent application Ser. No. 11/383,216 (Published as US Patent Application Publication 20070030573), the Back Window is sometimes referred to as a Round Blank. The Membrane 104 may extend over an edge of the Back Window 108 as seen in FIG. 1. The Membrane 104 may be mechanically secured and hermetically sealed to the Back Window 108, e.g., by an adhesive.

It will be clear to one skilled in the art that the above embodiment may be altered in many ways without departing from the scope of the invention. For example, the Back Window 108 (or at least a portion thereof) may be made of a deformable, e.g., elastomeric or deformable polymer material and may act as a second membrane in a manner similar to the transparent membrane 104. Alternatively, the Fluidic Lens 100 may include an optional back Membrane 104A. Examples of such configurations are described, e.g., in US Patent Application Publication 20070030573 and US Patent Application Publication 20070263292, both of which are incorporated herein by reference.

In some embodiments, the Inner Ring 106 may be made of a rigid material, such as a metal or rigid polymer. Alternatively, in some embodiments, the Inner Ring 106 (or at least a portion thereof) may be made of a deformable material, e.g., an elastomer or deformable polymer. If the Inner Ring 106 is deformable, an outer diameter of the Top Ring 102 may be sufficiently large compared to the outer diameter of the Inner Ring 106 that the Top Ring 102 may press upon and deform the Inner Ring 106, thereby exerting a displacement force on the Liquid 105. By way of example, the Outer Diameter of the Top Ring 102 may be equal to or greater than the Outer diameter of the Inner Ring 106. If the Inner Ring 106 includes a reservoir, some of the Liquid 105 may be expelled from the reservoir into the aperture region of the Fluidic Lens 100 when the Top Ring 102 presses upon the Inner Ring 106, thereby causing a displacement of the Membrane 104.

Also shown in FIG. 1, is an optional Front Window 110. In a practical implementation, this front Window 110 may serve a number of functions, such as mechanical protection of the elastomeric membrane, wavelength or polarization filtering, additional fixed refraction, etc. Such functions may alternatively be performed by the Back Window 108.

Another feature visible in FIG. 1 is the presence of lead screw threads 112 around the outer edges of the Top Ring 102. These threads 112 may be configured to mate to corresponding threads on an inner edge of a surrounding structure (not shown). When the Top Ring 102 is rotated relative to the surrounding structure (or vice versa), the mating threads on the surrounding structure (not shown) cause the ring to advance or recede against the membrane 104, thus adjusting the optical power of the fluidic lens 100.

The membrane 104 should be capable of stretching elastically, should be durable enough to have a lifetime suitable for its application. For example, in a cell phone camera application the membrane 104 should have a lifetime of several years and move than about one million cycles of operation. By way of example, and without limitation, the membrane 104 may be made of a silicone-based polymer such as poly(dimethylsiloxane) also known as PDMS or a polyester material such as PET or Mylar™. It is noted that if the fluid 105 and membrane 104 have sufficiently similar refractive indices, or include a suitable optical coating, scattering of light at their interface can be significantly reduced.

Examples of suitable materials for the membrane and refractive fluid as well as examples of various schemes for actuating the Piston Ring are described, e.g., in US Patent Application Publication 20070030573, which has been incorporated herein by reference. Among possible actuator solutions described therein are shape memory alloy (SMA) actuators, Electroactive Polymer (EAP) actuators also known as Electroactive Polymer Artificial Muscle (EPAM) actuators, electrostatic actuators, piezoelectric actuators, stepper motor, voice coil or other forms of motor actuators and electromagnetic (EM) actuators. In addition, certain forms of electrostatic actuator are described in U.S. Patent Application Publication U.S. Patent Application Publication 20070263293, which has been incorporated herein by reference.

By way of example, the fluid 105 may be silicone oil (e.g., Bis-Phenylpropyl Dimethicone). Additionally, fluid 105 may include fluorinated polymers such as perfluorinated polyether (PFPE) inert fluid. One example of a PFPE fluid is Fomblin® brand vacuum pump oil manufactured by Solvay Solexis of Bollate, Italy. The chemical chains of PFPE fluids such as Fomblin include fluorine, carbon and oxygen and have desirable properties including low vapor pressure, chemical inertness, high thermal stability, good lubricant properties, no flash or fire point, low toxicity, excellent compatibility with metals, plastics and elastomers, good aqueous and non-aqueous solvent resistance, high dielectric properties, low surface tension, good radiation stability and are environmentally acceptable.

Calculation of Membrane Shape

In the design of a fluidic lens of embodiments of the present invention it is useful to be able to relate the stroke d of the Top Ring to the resulting membrane curvature, R. In the thin membrane approximation, the desired formula may obtained from equating the volume pushed-in by the piston to the volume of the bulging membrane. The resulting equation is:

$$d(R, r_1) := \frac{\left(R - \sqrt{R^2 - r_1^2}\right)^2 \cdot \left(2 \cdot R + \sqrt{R^2 - r_1^2}\right)}{(r_1 + w)^2 + (r_1 + w) \cdot r_i + r_i^2} \qquad \text{Eq. 1}$$

Figure 2:
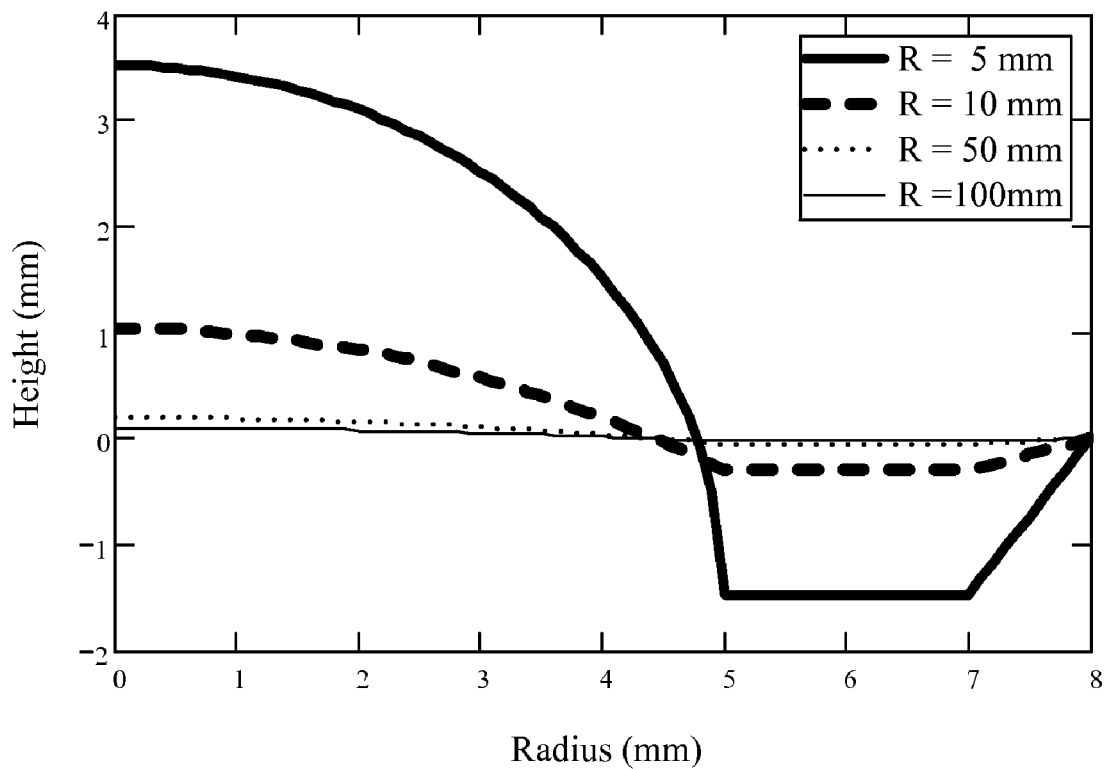
FIG. 2 is a graph depicting membrane profiles for various radii of curvature for a fluidic lens according to an embodiment of the present invention.

Where:
 d=piston stroke
 R=membrane curvature
 $r_1$=lens radius (clear aperture)
 $r_i$=radius of membrane anchor (Inner Ring)
 w=radial width of piston portion of Top Ring With this, the profile of the membrane may be plotted for various radii of curvature, as in FIG. 2. This profile is applicable as long as radius of the membrane anchor is larger than the outer piston radius ($r_1$+w). Although this provides much design latitude, in practice, such a device may need to be operated near the elastic limit of the membrane.

Strain Balancing

To make design latitude as great as possible, it is desirable to balance the strain in the inner (lens) and the outer (conical portion) regions of the membrane.

When the strain in the spherical cap is set equal to the strain in the conically-shaped outer portion of the membrane, the ratio x of the membrane outer radius $r_i$ to the inner radius $r_1$ becomes constrained by the following equation:

$$x(a, \rho) := [(1 + a)^3 + Rho(\rho)]^{\frac{1}{3}} \qquad \text{Eq. 2}$$

where:

$$x = \frac{r_i}{r_1}$$

$$a = \frac{w}{r_1}$$

$$\rho = \frac{R}{r_1}$$

$$Rho(\rho) := \frac{\left(\rho - \sqrt{\rho^2 - 1}\right)^2 \cdot \left(2 \cdot \rho + \sqrt{\rho^2 - 1}\right)}{\sqrt{\left(p \cdot a\sin\left(\frac{1}{\rho}\right)\right)^2 - 1}}$$

The function Rho is fairly constant as the dimensionless radius of curvature varies, except where R approaches $r_1$, i.e. the spherical cap approaches a hemispherical shape. This behavior of Rho(ρ) is illustrated in FIG. 3.

The asymptotic value of Rho is given by:

$$\lim_{\rho \to \infty} Rho(\rho) \to \frac{3}{4} \cdot 3^{\frac{1}{2}} - 1.299 \qquad \text{Eq. 3}$$

Figure 3:
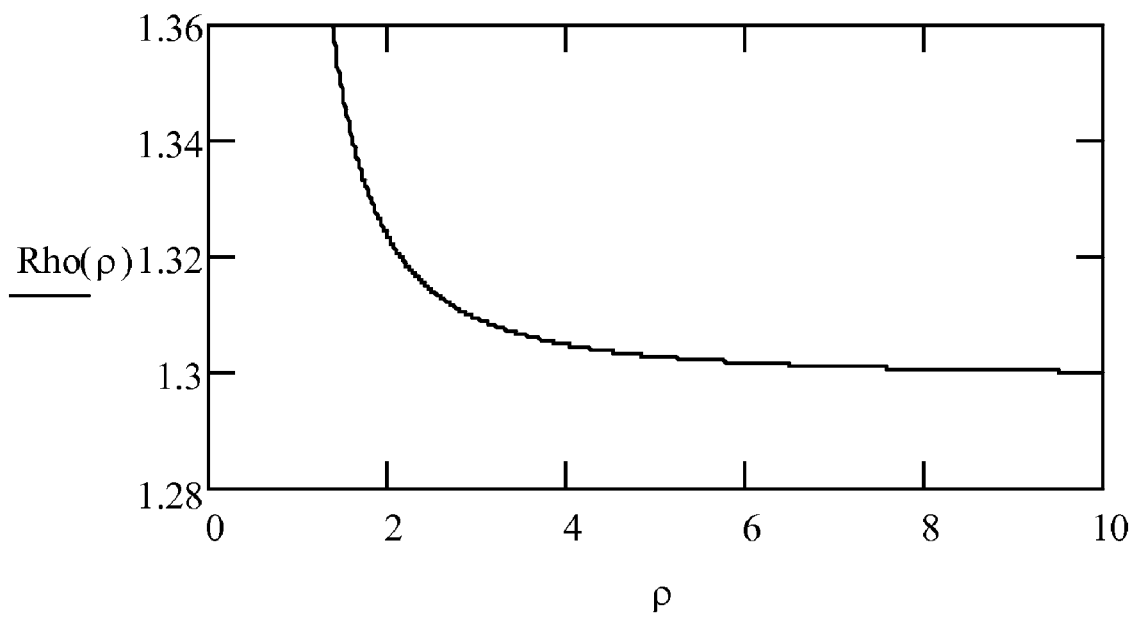
FIG. 3 is a graph illustrating an effect of radius of curvature on strain balancing in a fluidic lens membrane according to an embodiment of the present invention.

As can be seen from FIG. 3, the asymptotic value may be used with less than 2% error for dimensionless radii of curvature down to about 2. The other extreme is given by:

$$Rho(1) \to \frac{4}{(\pi^2 - 4)^{\frac{1}{2}}} = 1.651 \qquad \text{Eq. 4}$$

These two extremes may be reflected in the strain balancing (Equation 2):

$$x0(a) := \left[ (1+a)^3 + \frac{3\sqrt{3}}{4} \right]^{\frac{1}{3}} \qquad \text{Eq. 5a}$$

$$x1(a) := \left[ (1+a)^3 + \frac{4}{(\pi^2 - 4)^{\frac{1}{2}}} \right]^{\frac{1}{3}} \qquad \text{Eq. 5b}$$

To see graphically the effect of these strain balancing choices on fluid lens design, the dimensionality of the membrane outer radius may first be restored as follows:

$$r0_i(w, r_1) := r_1 \cdot x0\left(\frac{w}{r_1}\right)$$

$$r1_i(w, r_1) := r_1 \cdot x1\left(\frac{w}{r_1}\right)$$

Figure 4:
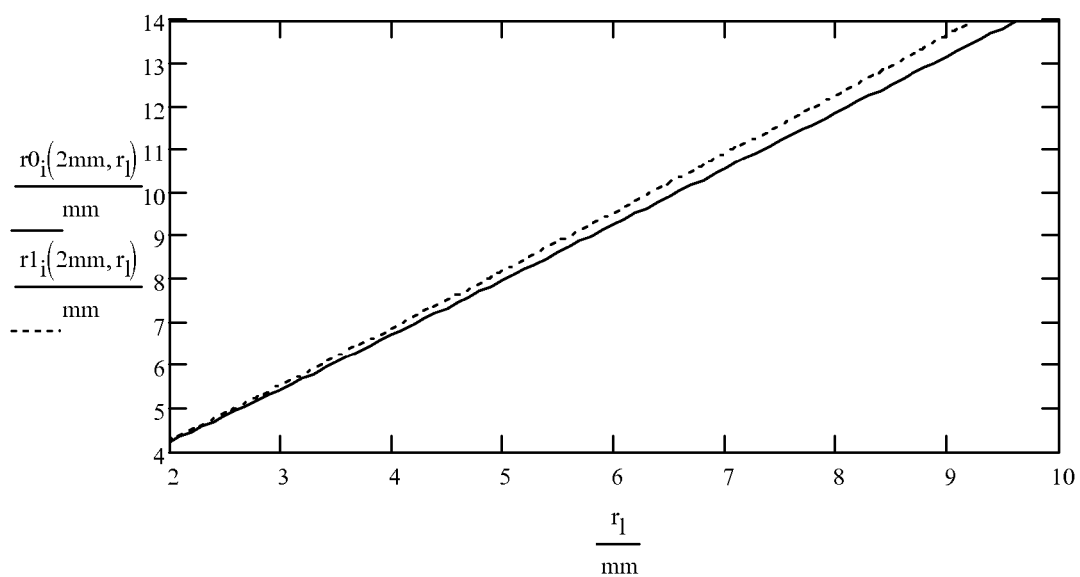
FIG. 4 is a graph illustrating relationships between lens radius and membrane anchor radius using extremes of strain balancing.

The resulting behavior is shown in FIG. 4. A piston width w of 2 mm has been assumed for the purposes of example.

It is clear that the difference in membrane design between these extreme cases is no more than a few percent in the region of interest shown in FIG. 4. The reason these extremes are attenuated so much is the presence of the cube root function in Equations 2, 5a and 5b. As a numerical example, when the clear aperture is 10 mm and the radial piston width is 2 mm, the membrane outer radius (or Inner Ring radius) varies by less than 3% when the strain is balanced at either high or low radius of curvature:

$$\frac{r1_i(2 \text{ mm}, 5 \text{ mm})}{r0_i(2 \text{ mm}, 5 \text{ mm})} = 1.028$$

Implementation of Strain Balancing

When strain balancing is implemented, the design of the fluid lens may be optimized for various objectives. To illustrate this, the membrane profile is graphically displayed in FIG. 5 in a way that facilitates design trade-off between Top Ring stroke and device footprint.

Figure 5:
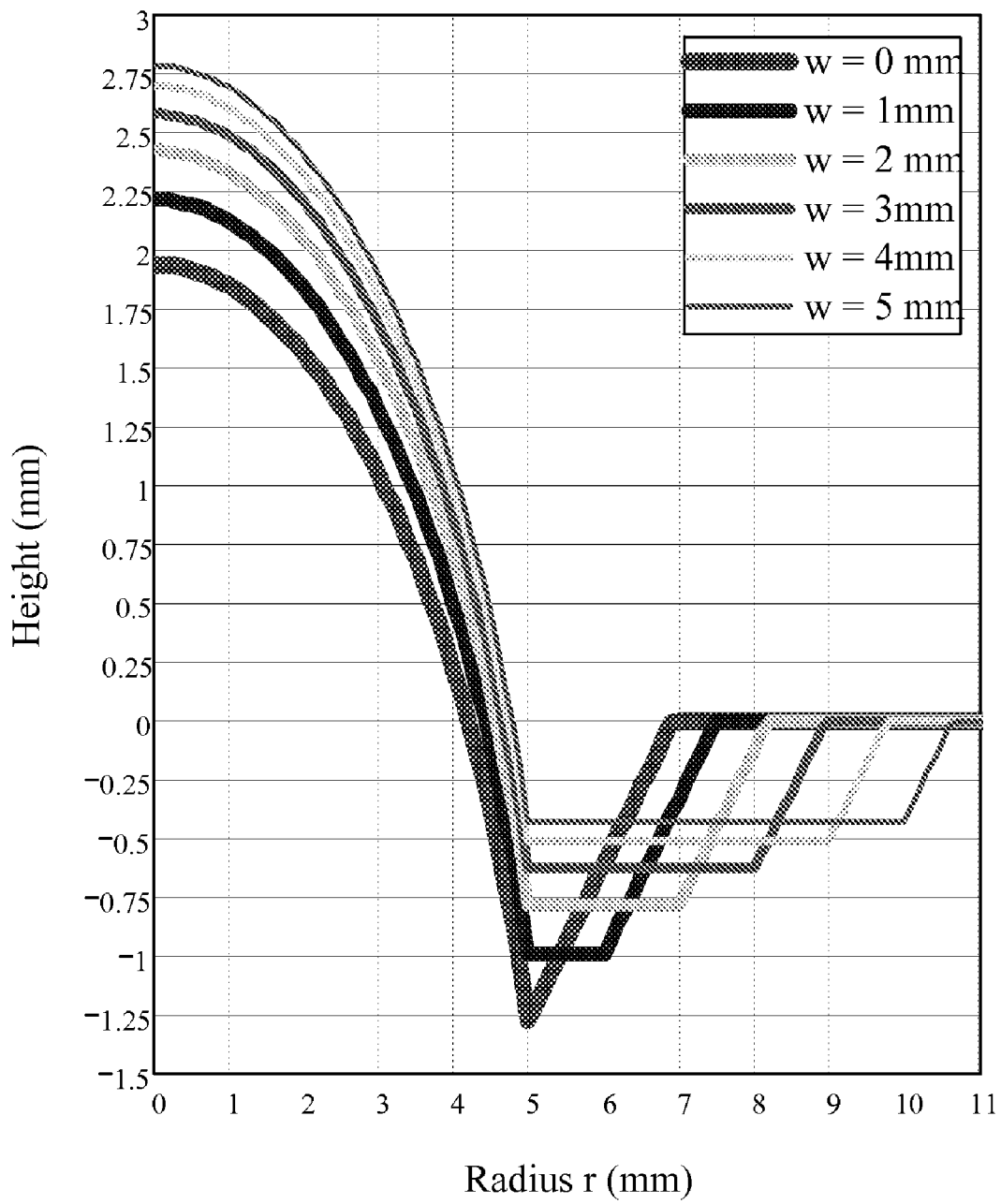
FIG. 5 is a graph illustrating membrane profiles for fluidic lenses with pistons of different widths.

In FIG. 5, fluidic lens membrane profiles are shown for lenses having pistons with different radial widths, thereby illustrating the effect of piston radial width on membrane profile It is noted that the lowest flat portion of each trace in FIG. 5 corresponds to the area where the piston face (e.g. the lower portion of the top ring) contacts the membrane. A height of zero designates a starting level of the membrane just before the Top Ring piston impinges on it. In this approximation, the amount of fluid initially contained in the lens is just sufficient to be contained by a flat membrane. A similar analysis may be carried out for alternatives where the initial membrane shape is either concave or convex. Conversely, by bonding the piston face to the membrane, it is possible to increase the achievable range of optical powers to encompass both positive and negative curvatures. By way of example, such bonding may be either adhesive based or may rely upon attraction between a magnetized Top Ring and a thin annular magnetic armature on the other side of the membrane. Either way, the figure clearly demonstrates that a larger piston allows a reduction in piston stroke for the same resulting optical power (or membrane radius of curvature).

Practical Applications

Figure 6:
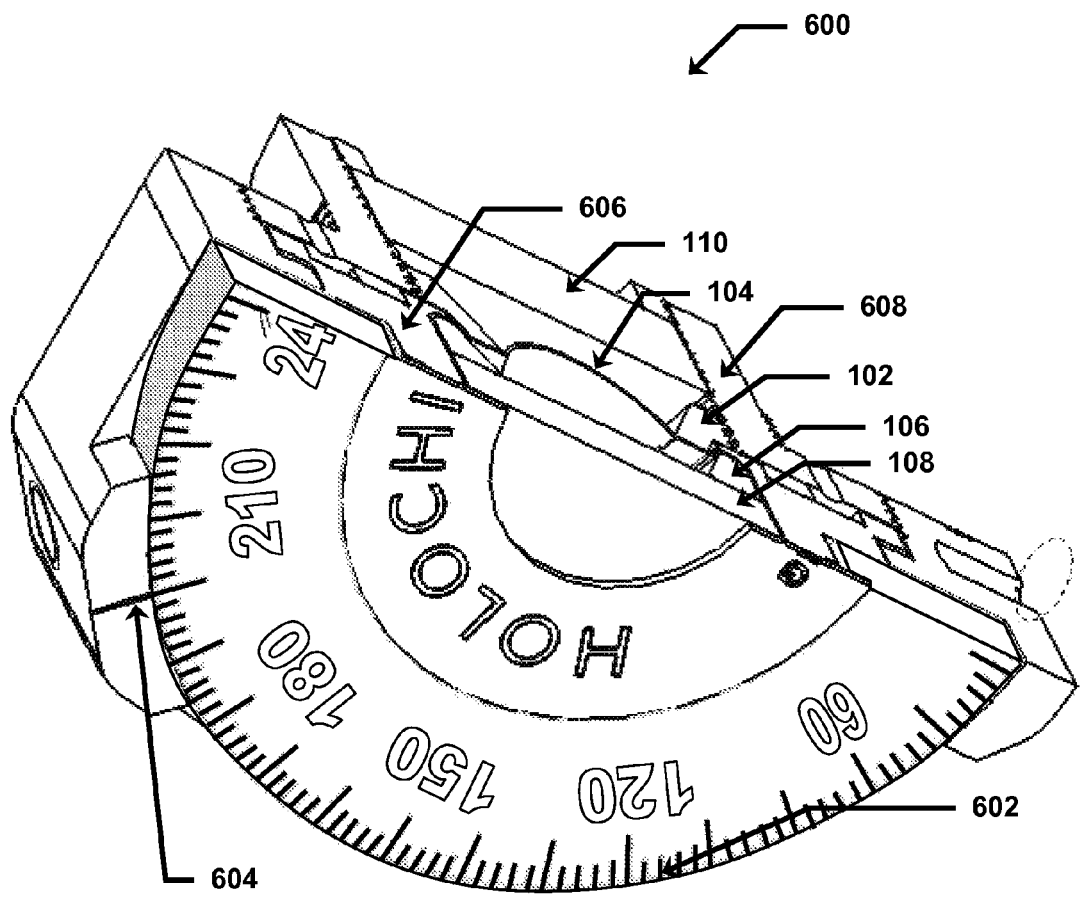
FIG. 6 is a three-dimensional cut-away diagram of a manually adjustable fluidic lens according to an embodiment of the present invention.

FIG. 6 shows the cross section of a manually adjustable fluidic lens 600 in accordance with an alternative embodiment of the present invention. In addition to the components first introduced in relation to FIG. 1, the fluidic lens 600 additionally includes a knurled Grip 602, bearing angular markings to be read against a Reference marking 604. The Grip 602 is manually rotatable by a user to adjust the optical power of the fluidic lens 600. The Grip 602 is mounted in fixed relationship to an Outer Ring 606. The Outer Ring 606, in turn, is slidably engaged with the Top Ring 102, so that a pure rotation of the former results in combined rotation and translation of the latter. The relative movement between the Top Ring 102 and the Membrane 104 is one of pure translation, whereby refractive adjustment is enabled without friction between these components.

Numerous variations of this structure are possible without departing from its essential inventive content. For instance, this device may be interfaced to the user's optical system by means of lens mounts engaging a Barrel portion 608 of the lens. This Barrel 608 may feature standardized threads, grooves or flats suitable for mating features of the lens mounts.

Alternatively, screw threads may be provided to engage mounting posts. One such thread is shown in FIG. 6 near the Reference marking 604.

The force of gravity may present a challenge to fluidic lens that is not normally associated with conventional lenses. In particular, since the Fluidic Lens 100 is filled with a fluid, the shape of the membrane 104 may depend on the orientation of lens with respect to the force of gravity. Generally, gravity acts on the fluid in a way that causes the fluid to exert a greater fluid pressure on lower regions than on upper regions. The pressure differential generally does not present a problem if the Fluidic lens is held substantially horizontal. However, lenses are often used in a vertical or tilted orientation. In such a situation, the force of gravity acting on the Liquid 105 may lead to asymmetries in the shape of the Membrane 104. For example, if the Fluidic lens is oriented such that its optical axis is more or less horizontal, lower portions of the may be more convex more than upper portions. Such asymmetries may lead to lens aberrations, such as coma.

To counteract the effect of gravity on the liquid 105, the Membrane 104 may be pre-tensioned to a degree sufficient to counteract the effect of gravity. Pre-tensioning of the Membrane 104 may also serve to raise a resonant frequency of the Membrane 104 (and, hence of the Fluidic lens 100) thereby making them less susceptible to transient aberrations due vibrations or acceleration of the lens. The required degree of pre-tensioning may be determined empirically by measuring optical aberrations or susceptibility to vibration or acceleration as a function of membrane pre-tensioning. Preferably, the pre-tensioning of the Membrane is sufficient to overcome asymmetry in the shape of the Membrane 104 when the Fluidic Lens 100 is in a vertical or tilted orientation.

By way of example, and not by way of limitation, the Membrane 104 may be pre-tensioned before assembly with the other components of the Fluidic Lens 100. Specifically, the Membrane may be placed over the Outer Ring 606. A tension may be applied to the Membrane 104 in a radially symmetric fashion with respect to an optical axis of the Fluidic Lens 100. The Inner Ring 106 may then be placed on the Membrane 104 and the Liquid 105 may be placed in the aperture of the Inner Ring 106. The Back Window 108 may then be placed over the Inner Ring 106 with the Liquid 105 retained between the Membrane 104, the Inner Ring 106 and the Back Window 108. The Back Window 108 and Inner Ring 106 may then be pressed into the Outer Ring 606. Adhesive may optionally be placed on the edge of the Back Window 108 prior to pressing to secure the Membrane 104 in place and retain its pre-tensioned condition. Alternatively, the Membrane may be held in place by friction between the Inner Ring 106 and Outer Ring 606 if the fit between the Inner Ring 106 and the Outer Ring 608 is sufficiently tight.

Adjustable fluidic lenses according to embodiments of the present invention may be used in numerous ways by optical researchers, engineers and other users of optical systems. Other uses include telescopes of civilian and military use, medical systems such as used by optometrists to test the vision of patients, etc.

Insofar as the description above and the accompanying drawing disclose any additional subject matter that is not within the scope of the single claim below, the inventions are not dedicated to the public and the right to file one or more applications to claim such additional inventions is reserved. Any feature described herein, whether preferred or not, may be combined with any other feature, whether preferred or not.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

What is claimed is:

1. A fluidic lens, comprising:
   a transparent window member;
   a transparent distensible membrane;
   an inner ring between the transparent window member and the membrane;
   a layer of liquid stored between the window member, the inner ring and the membrane; and
   a top ring disposed such that the membrane is between at least a portion of the top ring and at least a portion of the inner ring, wherein the top ring is adapted to apply a liquid displacement force to the membrane in a direction perpendicular to a plane of an aperture of the inner ring to cause a change in a radius of curvature of the membrane.

2. The fluidic lens of claim 1 wherein the top ring is characterized by an aperture radius and an annular thickness, wherein the annular thickness is greater than about 20% of the annular radius.

3. The fluidic lens of claim 1 wherein the top ring is characterized by an aperture radius and an annular thickness, wherein the annular thickness is greater than about 40% of the annular radius.

4. The fluidic lens of claim 1 wherein the top ring is characterized by an aperture radius and an annular thickness, wherein the annular thickness is greater than about 60% of the annular radius.

5. The fluidic lens of claim 1 wherein the top ring is characterized by an aperture radius and an annular thickness, wherein the annular thickness is greater than about 80% of the annular radius.

6. The fluidic lens of claim 1 wherein the top ring is characterized by an aperture radius and an annular thickness, wherein the annular thickness is greater than about 100% of the annular radius.

7. The fluidic lens of claim 1 wherein the inner ring has a conic frustum shaped inner surface characterized by a half angle.

8. The fluidic lens of claim 7 wherein the top ring has a conic frustum shaped outer surface characterized by a half angle, wherein the half angle for the outer surface is substantially the same as the half angle for the inner surface of the inner ring.

9. The fluidic lens of claim 1 wherein the top ring is threaded at an outer edge thereof.

10. The fluidic lens of claim 9, further comprising a surrounding structure adapted to receive the inner ring, membrane and top ring, the surrounding structure having inner threads that mate with the threads at the outer edge of the piston ring.

11. The fluidic lens of claim 1 wherein at least a portion of the window member is deformable.

12. The fluidic lens of claim 1 wherein at least a portion of the inner ring is deformable.

13. The fluidic lens of claim 12 wherein the inner ring includes at least one reservoir in fluid communication with an aperture of the fluidic lens.

14. The fluidic lens of claim 1 wherein the inner ring includes at least one reservoir in fluid communication with an aperture of the fluidic lens.

15. The fluidic lens of claim 1 wherein the transparent membrane is pre-tensioned.

16. The fluidic lens of claim 15 wherein the transparent membrane is pre-tensioned with a radial tension sufficient to counteract an asymmetry in the shape of the membrane when the fluidic lens is in a vertical or tilted orientation.

17. The fluidic lens of claim 1 wherein the fluidic lens is adapted to interface with an optical system by means of a lens mount.

18. The fluidic lens of claim 1 wherein at least a portion of the window member acts as a second membrane.

19. The fluidic lens of claim 1 wherein at least a portion of the window member includes a transparent distensible membrane.

20. The fluidic lens of claim 1 further comprising a second membrane disposed between the window member and the layer of liquid.

21. A method for making a fluidic lens, comprising:
   pre-tensioning a transparent distensible membrane;
   disposing an inner ring on the pre-tensioned membrane;
   placing a liquid in the inner ring;
   disposing a back window over the inner ring such that a layer of liquid is stored between the back window the inner ring and the membrane; and
   disposing a top ring such that the membrane is between at least a portion of the top ring and at least a portion of the inner ring. wherein the top ring is adapted to apply a liquid displacement force to the membrane in a direction perpendicular to a plane of an aperture of the inner ring to cause a change in a radius of curvature of the membrane.

22. The method of claim 21 further comprising securing a portion of the membrane to an edge of the back window.

23. The method of claim 21, further comprising pressing the membrane, inner ring and back window into an outer ring.

* * * * *